H. M. WEAVER.
Weighing-Scales.
No. 156,831.
Patented Nov. 10, 1874.
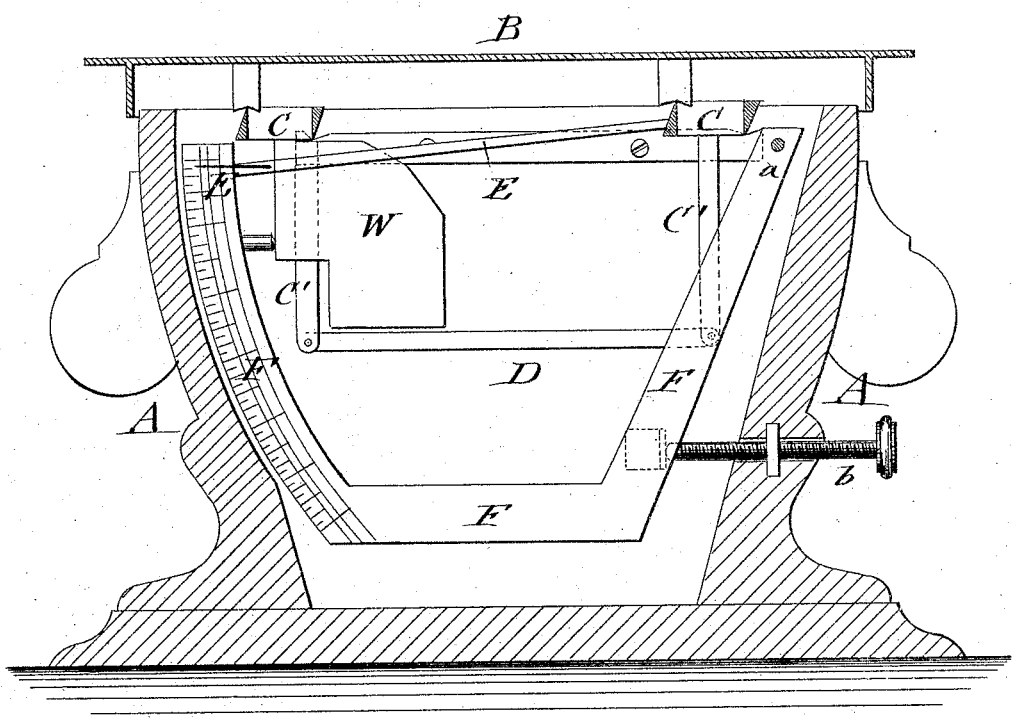
WITNESSES:
INVENTOR:
H. M. Weaver
BY Munn & Co
ATTORNEYS.

UNITED STATES PATENT OFFICE.

HENRY M. WEAVER, OF MANSFIELD, OHIO.

IMPROVEMENT IN WEIGHING-SCALES.

Specification forming part of Letters Patent No. 156,831, dated November 10, 1874; application filed June 13, 1874.

*To all whom it may concern:*

Be it known that I, HENRY M. WEAVER, of Mansfield, in the county of Richland and State of Ohio, have invented a new and Improved Weighing-Scale, of which the following is a specification:

The accompanying drawing represents a vertical longitudinal section of my improved scale for weighing letters and other objects.

My invention relates to improvements in weighing-scales, which may be so adjusted that the net weight of any article placed in a scoop or other receptacle on the platform may be directly read off at the dial-plate.

The invention consists of an adjustable pivoted dial-plate, arranged as hereinafter described.

In the drawing, A represents the incasing-frame of my scale; and B, the platform, which is supported on knife-edges of lateral swinging bars C. Bars C are pivoted on knife-edges on side standards or points of frame A, and provided with downward-extending lever-arms C', which are connected by a pivoted bottom rod, D. The balance-weight W is not attached to the lower rod D, but above the same to the lever-arm C', in such a manner that the body of the weight swings in the interior of the frame A. The radius of the arc described by the weight is thereby shorter, as when attached to the lower rod, which gives shorter and quicker vibrations, and causes sooner the cessation of the vibrations of the scale, as when the same are longer and slower.

By the position of the weight, a portion of the same is thrown above the horizontal line drawn to connect the pivoted points or edges of the bars, so that, by rising above the line, it proportionally loses its power as a counterweight, and causes the pointer or index-hand E, attached to the opposite bar, to describe equal distances, as before, on the dial-plate F, when equally-increased weights are placed upon the platform.

By making the dial or scale plate F adjustable, by attaching its symmetrically-opposite arm to a pivot, *a*, of the frame, and defining the position of dial-plate by a screw-bolt, *b*, or an equivalent device, the dial may be set by its zero point exactly to the index-hand after a scoop or other receptacle is placed upon the platform, and thereby the net weight of any article placed within the scoop indicated directly by the scale, which forms a point of great usefulness and convenience.

If the scale is used for ordinary purpose, the dial-plate is readjusted to the position of the index as given by the weight of the platform.

Having thus described my invention, I claim as new and desire to secure by Letters Patent—

As an improvement in letter-scales, a pivoted adjustable dial-plate, actuated by a set-screw, substantially as set forth.

HENRY M. WEAVER.

Witnesses:
GEORGE MOORHOUSE,
JNO. M. JOLLEY.